Patented Jan. 11, 1949

2,458,533

UNITED STATES PATENT OFFICE 2,458,533

MAGNESIA REFRACTORY

Robert A. Schoenlaub, Tiffin, Ohio, assignor to Basic Refractories, Inc., Cleveland, Ohio, a corporation of Ohio No Drawing. Application January 13, 1943, Serial No. 472,279

3 Claims. (Cl. 106—58)

In recent years considerable use has been made of unfired basic refractory bricks which depend initially for their strength on chemicals and not on permanent bonds, these chemicals imparting a relatively high green strength on drying. Such refractories have an advantage over burned bricks in that they are cheaper and may be pressed to an exact size. They have the serious disadvantage however that at a comparatively low temperature the bonds burn out and leave a weak and inferior structure. As an example of this deficiency, a chemically bonded refractory which is applied in a Portland cement kiln will be strong in the location where it has not been heated to an appreciable temperature and will also be strong in that portion where the heating has been at a sufficient temperature to develop a permanent ceramic bond. But in that portion which has been heated to an intermediate temperature the structure will be weak and prone to crumble. This weakness has constituted a serious obstacle to the more extensive use of chemically bonded basic brick. In accordance with the present invention refractories may be treated so as to develop into a particularly durable state.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The invention may be applied variously, in accordance with the particular material and conditions to be dealt with. Where involving cements or mortars there is included an agent which is substantially evanescent above about 1600° F. and which includes an element of the righthand column of periodic groups V and VI having atomic weight not less than sulphur nor greater than tellurium. Sulphur, arsenic, tellurium, antimony, and somewhat less advantageously selenium, alone or in combination with each other or with metals, e. g. arsenic sulphide, iron sulphide, etc. are instances. Sulphur is not effective in the oxidized form of $SO_2$ and $SO_3$, and should not be used along with oxidizing substances such as carbonates or sulphates, unless it is in sufficient excess to avoid complete loss by oxidation. Antimony is effective when added either as an oxide or the element, therefore the consideration of whether the atmosphere is oxidizing or reducing is immaterial. Antimony-providing compounds are especially effective with chrome or chrome-containing bricks. Antimony reacts somewhat more slowly than sulphur. The ultimate volatility or evanescence of these materials is advantageous in that they leave the final refractoriness of the bonded refractory unimpaired. Peculiarly also, the fact that these materials are volatile permits them to permeate brick or adjacent refractory not originally containing such substance, and results in improvement of the brick also, as the heat of the furnace diffuses the material into the brick, thereby improving its strength at intermediate temperatures, i. e. in general 1000 to 1800° F., as well as improving the strength of the mortar. Bricks laid up with mortar in accordance with the present invention, on test were found to be around 100 per cent stronger in modulus of rupture than similar brick not receiving the benefit of such diffusion from this kind of mortar. The amount of the sulphur or the like incorporated in the mortar composition may vary, depending upon particular conditions and results in view, and in general may be from 1 to 15 per cent, and usually more than 5 per cent.

If it be desired to make a mortar from magnesian clinker, the clinker used should be stable and contain 65 per cent or more MgO.

Practical characteristics desired in mortars are that they should retain water for a sufficient time to allow working in contact with porous brick, and there should be suitable plasticity. When dried, they should have some strength, and on heating should weld the bricks to a more or less monolithic structure. At high temperatures they should not react with the brick, and they should have refractoriness of the same general order. The intermediate temperature bonding agent, as sulphur or the like in accordance with the present invention, is incorporated as fine material in the mortar and does not affect the workability; mortar or cements are then handled and applied in usual manner. A low temperature bond, as sodium silicate or the like may also be included in small amount.

While action on the bricks or shapes may thus be applied by a mortar containing a volatilizing or evanescent agent which diffuses into the adjacent refractory material, in some instances it is desired to apply treatment by the evanescent agent without use of a mortar or cementitious composition, and the sulphur or other agent as above indicated, may be applied in any convenient manner such as to volatilize it and subject the refractory to its action in such diffusing condition. Thus, un-fired bricks or refractory wall surfaces may be exposed to the atmosphere of sulphur or like evanescent agent, at a sufficient temperature to provide diffusion and action. Or, bricks or shapes may be burned, and may be finally treated with the sulphur or like evanescent agent by providing an atmosphere thereof in the kiln or treating-chamber.

Thus, for example: Magnesite brick are burned in a periodic kiln at a temperature of about 2500° F., and on completion of the burning the firing ports and stacks are closed, and sulplur or antimony oxide is introduced, a satisfactory amount being for instance about 17 pounds per thousand cubic feet of the chamber size in the treating zone. The heat in the kiln volatilizes the sulphur and diffusion into the brick results.

As another example: For providing sulphur a cementitious composition is made of a magnesia clinker having a composition MgO 80 per cent, CaO 8 per cent, $B_2O_3$ 0.05 per cent, $SiO_2$ 4 per cent, $Fe_2O_3$ 3 per cent, $Cr_2O_3$ 2.5 per cent, $Al_2O_3$ 2 per cent. This, ground to 50 per cent minus 200 mesh, in amount of 86.5 per cent is mixed with 10 per cent of minus 100 mesh sulphur, 1.5 per cent of minus 200 mesh bentonite, and 2 per cent of minus 100 mesh sodium silicate ($Na_2O$ 19.4 per cent and $SiO_2$ 62.5 per cent). Made up with water as a mortar, it is employed in usual manner in laying up for instance chemically bonded un-burned magnesite-chrome brick.

As another example: With similar amounts of finely ground clinker and bentonite or clay and sodium silicate there is incorporated 10 per cent of minus 100 mesh antimony oxide. This composition, made up with water as a mortar, is employed in the usual manner for instance in laying chemically bonded un-burned chrome brick.

As another example: A low silica chrome ore ground to 90 per cent minus 100 mesh is mixed with 1.5 per cent of minus 200 mesh bentonite and 2 per cent of minus 100 mesh sodium silicate and 7 per cent of minus 100 mesh antimony oxide. This may be used as a cement or mortar for laying bricks or shapes in place.

Bricks adjacent to such mortars, exposed to temperatures of 1200 to 1800° F. for 24 hours or more are acted upon by the diffusing sulphur or the like and are materially stronger than similar brick not exposed to the action of such strength-imparting agents and tested at these temperatures.

Other modes of applying the principle of the invention may be employed, change being made as regards the details described, provided the features stated in any of the following claims, or the equivalent of such, be employed.

I therefore particularly point out and distinctly claim as my invention:

1. Refractory matter comprising a ground magnesia-providing clinker having a large proportion of minus 200 mesh particles, volatilizing bonding means for the magnesia clinker at temperatures of 1000° to 1800° F. embodying 1–15 per cent of sulphur, and a small per cent each of a plasticizing agent and soluble silicate binder.

2. Refractory matter comprising a ground magnesia-providing clinker having a large proportion of minus 200 mesh particles, volatilizing bonding means for the magnesia clinker at temperatures of 1000° to 1800° F. embodying 1–15 per cent of antimony oxide, and a small per cent each of a plasticizing agent and soluble silicate binder.

3. Refractory matter comprising a ground magnesia-providing clinker having a large proportion of minus 200 mesh particles, volatilizing bonding means for the magnesia clinker at temperatures of 1000° to 1800° F. embodying 1–15 per cent of an agent which includes an element of the righthand column of periodic groups V and VI having atomic weight not less than sulphur nor greater than tellurium, and a small per cent each of a plasticizing agent and soluble silicate binder.

ROBERT A. SCHOENLAUB.

REFERENCES CITED

The following references are of record in the file of this patent:

UNITED STATES PATENTS

| Number | Name | Date |
|---|---|---|
| 135,721 | Monk | Feb. 11, 1873 |
| 339,519 | Barnes | Apr. 6, 1886 |
| 400,527 | Walsh | Apr. 2, 1889 |
| 407,271 | Woodward | July 16, 1889 |
| 1,237,520 | Ivery | Aug. 21, 1917 |
| 1,992,482 | Heuer | Feb. 26, 1935 |
| 2,170,254 | Seil | Aug. 22, 1939 |
| 2,232,462 | Lower | Feb. 18, 1941 |
| 2,296,002 | Tym | Sept. 15, 1942 |
| 2,322,274 | Birch et al. | June 22, 1943 |
| 2,347,968 | Ross | May 2, 1944 |

FOREIGN PATENTS

| Number | Country | Date |
|---|---|---|
| 1,884 | Great Britain | 1877 |
| 1,628 | Great Britain | 1882 |
| 13,328 | Great Britain | 1885 |
| 136,013 | Austria | 1933 |